(12) United States Patent
Cassani et al.

(10) Patent No.: US 9,835,064 B2
(45) Date of Patent: Dec. 5, 2017

(54) METHOD AND SYSTEM FOR DIAGNOSING EFFICIENCY OF AN AFTERTREATMENT SYSTEM OF AN INTERNAL COMBUSTION ENGINE

(71) Applicant: GM GLOBAL TECHNOLOGY OPERATIONS LLC, Detroit, MI (US)

(72) Inventors: Stefano Cassani, Altavilla Monferrato (IT); Paolo Francesco Carminati, Turin (IT); Nicola Pio Sacco, Manfredonia (IT)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 71 days.

(21) Appl. No.: 15/085,301

(22) Filed: Mar. 30, 2016

(65) Prior Publication Data

US 2016/0290196 A1    Oct. 6, 2016

(30) Foreign Application Priority Data

Apr. 1, 2015   (GB) .................................. 1505703.7

(51) Int. Cl.
*F01N 11/00*       (2006.01)
*F01N 3/023*       (2006.01)
(Continued)

(52) U.S. Cl.
CPC ............. *F01N 3/023* (2013.01); *F01N 3/106* (2013.01); *F01N 11/002* (2013.01);
(Continued)

(58) Field of Classification Search
CPC ........ F01N 3/023; F01N 3/0253; F01N 3/103; F01N 3/106; F01N 11/002; F01N 13/009; F01N 2430/085; F01N 2550/02; F01N 2560/06; F01N 2560/14; F01N 2610/03; F01N 2900/1404; F01N 2900/1602; F01N 2900/1618; F01N 2900/1631
(Continued)

(56) References Cited

U.S. PATENT DOCUMENTS

2008/0000219 A1    1/2008  Ratcliff et al.
2015/0096283 A1*   4/2015  Dong ...................... F01N 3/021
                                                          60/274

OTHER PUBLICATIONS

Great Britain Patent Office, Great Britain Search Report for Great Britain Application No. GB1505703.7, dated Sep. 24, 2015.

* cited by examiner

*Primary Examiner* — Jorge Leon, Jr.
(74) *Attorney, Agent, or Firm* — Lorenz & Kopf LLP

(57) ABSTRACT

An aftertreatment system for an internal combustion system includes an exhaust duct, an oxidation catalyst disposed in the exhaust duct and a particulate filter disposed in the exhaust duct downstream of the oxidation catalyst. The internal combustion engine is operated to perform a regeneration process of the particulate filter. A first value of exhaust gas temperature in the exhaust duct between the oxidation catalyst and the particulate filter is determined. A second value of exhaust gas temperature in the exhaust duct downstream of the particulate filter is determined. A malfunctioning of the oxidation catalyst is determined when the first value of exhaust gas temperature is below a first predetermined threshold value thereof and contemporaneously the second value of exhaust gas temperature is above a second predetermined threshold value thereof during the regeneration process.

11 Claims, 2 Drawing Sheets

(51) Int. Cl.
*F01N 13/00* (2010.01)
*F01N 3/10* (2006.01)

(52) U.S. Cl.
CPC ............ *F01N 13/009* (2014.06); *F01N 3/103* (2013.01); *F01N 2430/085* (2013.01); *F01N 2550/02* (2013.01); *F01N 2560/06* (2013.01); *F01N 2560/14* (2013.01); *F01N 2610/03* (2013.01); *F01N 2900/1404* (2013.01); *Y02T 10/47* (2013.01)

(58) Field of Classification Search
USPC ......... 60/274, 277, 285, 286, 295, 297, 300, 60/303, 311, 320
See application file for complete search history.

METHOD AND SYSTEM FOR DIAGNOSING EFFICIENCY OF AN AFTERTREATMENT SYSTEM OF AN INTERNAL COMBUSTION ENGINE

CROSS-REFERENCE TO RELATED APPLICATION

This application claims priority to Great Britain Patent Application No. 1505703.7, filed Apr. 1, 2015, which is incorporated herein by reference in its entirety.

TECHNICAL FIELD

The present disclosure pertains to a method and a system for diagnosing efficiency of an aftertreatment system of an internal combustion engine, such as a Diesel engine of a motor vehicle.

BACKGROUND

It is known that an internal combustion engine of a motor vehicle is equipped with an aftertreatment system designed to change the composition of the exhaust gas in order to reduce the pollutant emissions. Some aftertreatment systems may include a catalytic converter, for example a Diesel oxidation catalyst (DOC), followed by a particulate filter, for example a Diesel particulate filter (DPF). A Diesel oxidation catalyst usually comprises a catalyst substrate (core), for example a ceramic monolith with a honeycomb structure, which supports a wash coat that carries catalytic materials, usually a mixture of precious metals, suitable for prompting the oxidation of unburned hydrocarbons (HC) and carbon monoxides (CO) into carbon dioxides ($CO_2$) and water ($H_2O$).

A Diesel particulate filter is a device that includes a ceramic body similar to the core of an oxidation catalyst but specifically designed to trap diesel particulate matter or soot contained in the exhaust gas. Most diesel particulate filters also include a wash coat containing a small quantity of precious metals, whose concentration is much lower than the concentration of precious metals in the oxidation catalyst (e.g. 10%) but still enough to promote oxidation reactions at high temperatures. When the accumulated particulate matter exceeds a predetermined threshold value, the diesel particulate filters are subjected to a regeneration process that empties the filter and restores its original efficiency.

This regeneration process is usually performed by increasing the temperature of the particulate filter up to a temperature (e.g. 630° C.) that causes the accumulated particulate matter to burn off. One of the most widely used strategies to increase the filter temperature is that of operating the fuel injectors of the internal combustion engine to execute so-called post injections. The post injections are small quantities of fuel that are injected into the combustion chambers of the engine during the exhaust stroke of the piston, when the exhaust valves are already open. These small quantities of fuel exit unburnt from the combustion chamber and reach the Diesel oxidation catalyst, where they are ignited and generate a stream of hot exhaust gas that flows towards the Diesel particulate filter located downstream, thereby increasing its temperature.

However, during the lifetime of the Diesel oxidation catalyst, the conversion efficiency of this component is not constant but decreases progressively due to ageing and/or poisoning effects. For this reason, it may happen that the conversion efficiency of the Diesel oxidation catalyst reaches a level which still allows this component to reduce the polluting emissions during the normal operation of the engine, but makes it unsuitable to efficiently oxidize the post injected fuel quantities during the regeneration process of the Diesel particulate filter. As a consequence, these post injected fuel quantities may exit unburnt from the Diesel oxidation catalyst and be ignited just inside the Diesel particulate filter, due to precious metals contained in its wash coat, thereby increasing the thermal stress of this component and of other neighboring components of the motor vehicle, such as the vehicle under hood and underfloor.

SUMMARY

In view of the above, the present disclosure provides a system and method of identifying when an oxidation catalyst becomes unable to support the regeneration process of a particulate filter, thereby allowing the adoption of countermeasures that can prevent the above mentioned side effects in a simple, rational and rather inexpensive solution.

In an embodiment, a method of diagnosing efficiency of an aftertreatment system of an internal combustion engine is provided. The aftertreatment system includes an exhaust duct, an oxidation catalyst disposed in the exhaust duct and a particulate filter disposed in the exhaust duct downstream of the oxidation catalyst. The internal combustion engine is operated to perform a regeneration process of the particulate filter. A first value of exhaust gas temperature in the exhaust duct between the oxidation catalyst and the particulate filter is determined. A second value of exhaust gas temperature in the exhaust duct downstream of the particulate filter is determined. A malfunctioning of the oxidation catalyst is determined when the first value of exhaust gas temperature is below a first predetermined threshold value thereof and contemporaneously the second value of exhaust gas temperature is above a second predetermined threshold value thereof during the regeneration process.

This method is based on the fact that, if the oxidization efficiency of the oxidation catalyst is poor, during a regeneration process of the particulate filter, not all the post injected fuel quantities will burn inside the oxidation catalyst, so that the temperature of the exhaust gas between the oxidation catalyst and the particulate filter will be lower than expected. At the same time, the post injected fuel quantities that exit unburnt from the oxidation catalyst will burn inside the particulate filter, due to the precious metals in its wash coat, so that the temperature of the exhaust gas downstream of the particulate filter will be higher than expected. By looking at these two temperature values, the disclosed method represents a simple and reliable solution for identifying that the oxidation catalyst is unable to support the regeneration of the particulate filter.

According to an aspect of the solution, the determination of the first value of the exhaust gas temperature may be achieved through a measurement, for example by means of a temperature sensor disposed in the exhaust duct between the oxidation catalyst and the particulate filter. In this way the determination of the first temperature value becomes more reliable and the entire method more efficient.

According to another aspect of the solution, the determination of the second value of the exhaust gas temperature may be achieved through a measurement, for example by means of a temperature sensor disposed in the exhaust duct downstream of the particulate filter. In this way the determination of the second temperature value becomes more reliable and the entire method more efficient.

Another aspect of the solution may provide that the second threshold value is equal or larger than the first threshold value. This aspect of the solution guarantees that exothermic reactions have occurred inside the particulate filter.

According to another aspect of the solution, the first threshold value may depend on engine speed and engine torque. In this way the first threshold value of the exhaust gas temperature can change allowing the diagnostic method to be efficiently performed also under transient operating conditions of the engine.

According to another aspect of the solution, the second threshold value may depend on engine speed and engine torque. In this way the second threshold value of the exhaust gas temperature can change allowing the diagnostic method to be efficiently performed also under transient operating conditions of the engine.

Another aspect of the solution may provide that the malfunctioning of the oxidation catalyst is identified only if the first value of exhaust gas temperature is below the first threshold value and contemporaneously the second value of exhaust gas temperature is above the second threshold value for longer than a predetermined time period during the regeneration process. This aspect of the solution may reduce the probability of false identifications, thereby improving the reliability of the diagnostic method.

According to another aspect of the solution, the method may also include the step of inhibiting the regeneration process if the malfunctioning is identified. This aspect makes it possible to prevent an excessive thermal stress of the particulate filter.

Another aspect of the solution may provide that the method includes the step of limiting engine torque if the malfunctioning is identified. Also this aspect has the effect of preventing an excessive thermal stress of the particulate filter.

According to a further aspect of the solution, the method may include the step of generating a signal perceivable by a driver if the malfunctioning is identified. In this way the driver may be informed of the malfunctioning of the oxidation catalyst and that a service intervention is needed.

The proposed solution may be carried out with the help of a computer program including a program-code for executing the method described above, and in the form of a computer program product including the computer program. The method can be also embodied as an electromagnetic signal modulated to carry a sequence of data bits which represent a computer program to carry out all steps of the method.

The present solution may be alternatively embodied as a system for diagnosing efficiency of an aftertreatment system of an internal combustion engine. Again, the aftertreatment system includes an exhaust duct, an oxidation catalyst disposed in the exhaust duct and a particulate filter disposed in the exhaust duct downstream of the oxidation catalyst. An electronic control unit is configured to operate the internal combustion engine to perform a regeneration process of the particulate filter, determine a first value of exhaust gas temperature in the exhaust duct between the oxidation catalyst and the particulate filter, determine a second value of exhaust gas temperature in the exhaust duct downstream of the particulate filter, and identify a malfunctioning of the oxidation catalyst when the first value of exhaust gas temperature is below a first predetermined threshold value thereof and contemporaneously the second value of exhaust gas temperature is above a second predetermined threshold value thereof during the regeneration process. This embodiment achieves basically the same effects of the method described above, particularly that of providing a simple and reliable solution for detecting that the oxidation catalyst is unable to support the regeneration of the particulate filter.

According to an aspect of the solution, the electronic control unit may be configured to determinate the first value of the exhaust gas temperature through a measurement, for example by means of a temperature sensor disposed in the exhaust duct between the oxidation catalyst and the particulate filter. In this way the determination of the first temperature value becomes more reliable and the entire method more efficient.

According to another aspect of the solution, the electronic control unit may be configured to determine the second value of the exhaust gas temperature through a measurement, for example by means of a temperature sensor disposed in the exhaust duct downstream of the particulate filter. In this way the determination of the second temperature value becomes more reliable and the entire method more efficient.

Another aspect of the solution may provide that the second threshold value is equal or larger than the first threshold value. This aspect of the solution guarantees that exothermic reactions have occurred inside the particulate filter.

According to another aspect of the solution, the electronic control unit may be configured to determine the first threshold value on the basis of engine speed and engine torque. In this way the first threshold value of the exhaust gas temperature can change allowing the diagnostic method to be efficiently performed also under transient operating conditions of the engine.

According to another aspect of the solution, the electronic control unit may be configured to determine the second threshold value on the basis of engine speed and engine torque. In this way the second threshold value of the exhaust gas temperature can change allowing the diagnostic method to be efficiently performed also under transient operating conditions of the engine.

Another aspect of the solution may provide that the electronic control unit is configured to identify the malfunctioning of the oxidation catalyst (only) if the first value of exhaust gas temperature is below the first threshold value and contemporaneously the second value of exhaust gas temperature is above the second threshold value for longer than a predetermined time period during the regeneration process. This aspect of the solution may reduce the probability of false identifications, thereby improving the reliability of the diagnostic method.

According to another aspect of the solution, the electronic control unit may be configured to inhibit the regeneration process if the malfunctioning is identified. This aspect makes it possible to prevent an excessive thermal stress of the particulate filter.

Another aspect of the solution may provide that the electronic control unit is configured to limit engine torque if the malfunctioning is identified. Also this aspect has the effect of preventing an excessive thermal stress of the particulate filter.

According to a further aspect of the solution, the electronic control unit may be configured to generate a signal perceivable by a driver if the malfunctioning is identified. In this way the driver may be informed of the malfunctioning of the oxidation catalyst and that a service intervention is needed.

Another embodiment of the solution provides an automotive system including an internal combustion engine and an aftertreatment system having an exhaust duct, an oxidation catalyst disposed in the exhaust duct and a particulate filter disposed in the exhaust duct downstream of the oxidation catalyst. The automotive system further includes means for operating the internal combustion engine to perform a regeneration process of the particulate filter, means for determining a first value of exhaust gas temperature in the exhaust duct between the oxidation catalyst and the particulate filter, means for determining a second value of exhaust gas temperature in the exhaust duct downstream of the particulate filter, and means for identifying a malfunctioning of the oxidation catalyst when the first value of exhaust gas temperature is below a first predetermined threshold value thereof and contemporaneously the second value of exhaust gas temperature is above a second predetermined threshold value thereof during the regeneration process. This embodiment achieves basically the same effects of the method described above, particularly that of providing a simple and reliable solution for detecting that the oxidation catalyst is unable to support the regeneration of the particulate filter.

According to an aspect of the solution, the first value of the exhaust gas temperature is determined from a measurement with a temperature sensor disposed in the exhaust duct between the oxidation catalyst and the particulate filter. In this way the determination of the first temperature value becomes more reliable and the entire method more efficient.

According to another aspect of the solution, the second value of the exhaust gas temperature is determined from a measurement with a temperature sensor disposed in the exhaust duct downstream of the particulate filter. In this way the determination of the second temperature value becomes more reliable and the entire method more efficient.

Another aspect of the solution may provide that the second threshold value is equal or larger than the first threshold value. This aspect of the solution guarantees that exothermic reactions have occurred inside the particulate filter.

According to another aspect of the solution, the automotive system may include means for determining the first threshold value on the basis of engine speed and engine torque. In this way the first threshold value of the exhaust gas temperature can change allowing the diagnostic method to be efficiently performed also under transient operating conditions of the engine.

According to another aspect of the solution, the automotive system may include means for determining the second threshold value on the basis of engine speed and engine torque. In this way the second threshold value of the exhaust gas temperature can change allowing the diagnostic method to be efficiently performed also under transient operating conditions of the engine.

Another aspect of the solution the malfunctioning of the oxidation catalyst is identified only if the first value of exhaust gas temperature is below the first threshold value and contemporaneously the second value of exhaust gas temperature is above the second threshold value for longer than a predetermined time period during the regeneration process. This aspect of the solution may reduce the probability of false identifications, thereby improving the reliability of the diagnostic method.

According to another aspect of the solution, the automotive system may include means for inhibiting the regeneration process if the malfunctioning is identified. This aspect makes it possible to prevent an excessive thermal stress of the particulate filter.

Another aspect of the solution may provide that the automotive system includes means for limiting engine torque if the malfunctioning is identified. Also this aspect has the effect of preventing an excessive thermal stress of the particulate filter.

According to a further aspect of the solution, the automotive system may include means for generating a signal perceivable by a driver if the malfunctioning is identified. In this way the driver may be informed of the malfunctioning of the oxidation catalyst and that a service intervention is needed.

BRIEF DESCRIPTION OF THE DRAWINGS

The present disclosure will hereinafter be described in conjunction with the following drawing figures, wherein like numerals denote like elements.

FIG. 1 is a schematic representation of an automotive system according to an embodiment of the present solution;

FIG. 2 is the section A-A of the internal combustion engine belonging to the automotive system of FIG. 1.

DETAILED DESCRIPTION

Figure 3:
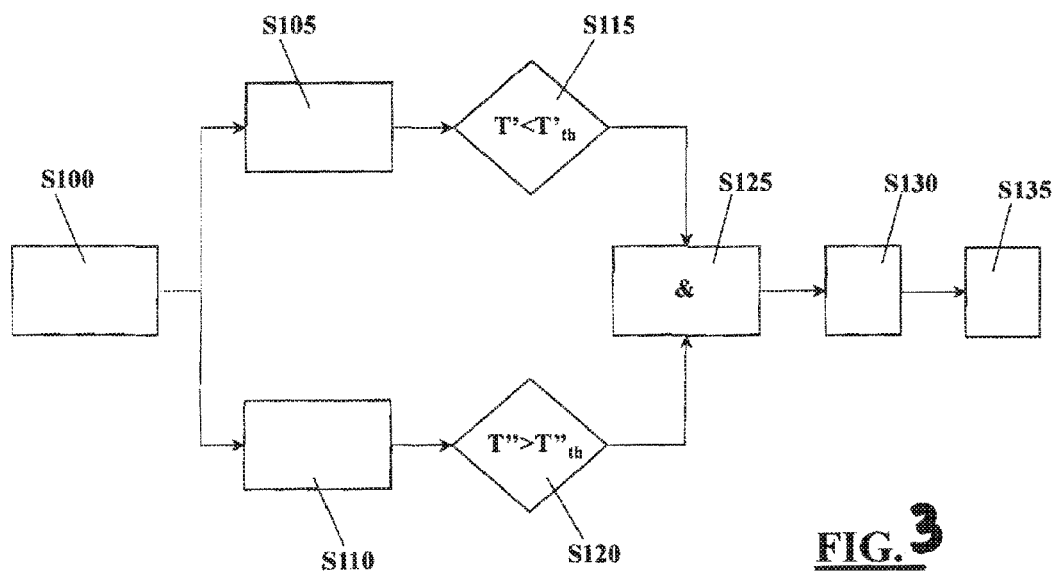
FIG. 3 is a flowchart representing a strategy of diagnosing a malfunctioning of an oxidation catalyst.

The following detailed description is merely exemplary in nature and is not intended to limit the invention or the application and uses of the invention. Furthermore, there is no intention to be bound by any theory presented in the preceding background of the invention or the following detailed description.

Figures 1, 2:
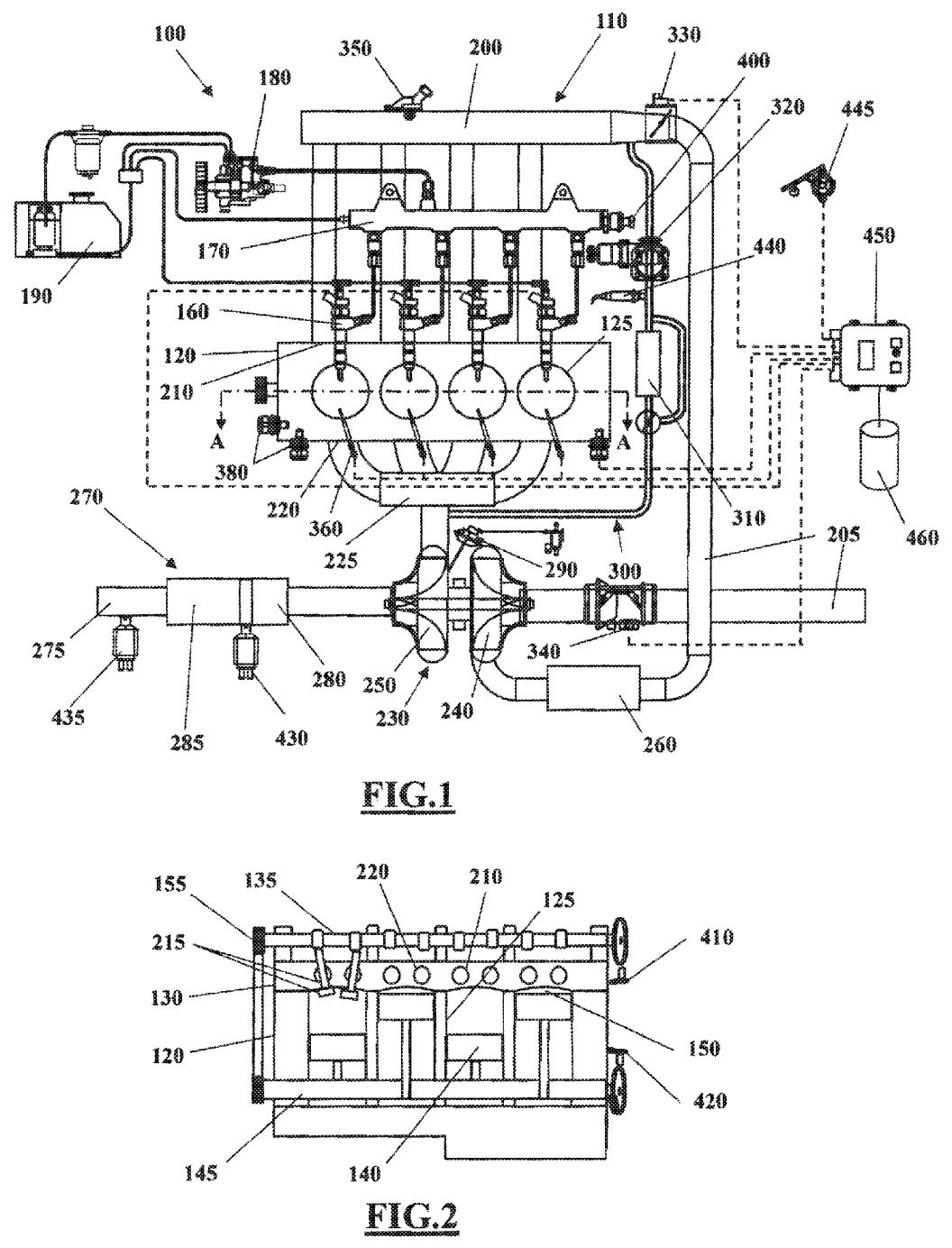

Some embodiments may include an automotive system 100 (e.g. a motor vehicle), as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an aftertreatment system 270. The aftertreatment system 270 may include an exhaust duct 275 having one or more exhaust aftertreatment devices. The aftertreatment devices may be any device configured to change the composition of the exhaust gases. In the present example, the aftertreatment devices include a Diesel oxidation catalyst (DOC) 280 and a Diesel particulate filter (DPF) 285 located in the exhaust duct 75 downstream of the DOC 280.

Some embodiments may also include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, a first temperature sensors 430 located in the exhaust duct 275 between the DOC 280 and the DPF 285, a second temperature sensors 435 located in the exhaust duct 275 downstream of the DPF 285, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

One of the tasks of the ECU 450 may be that of performing a regeneration process of the DPF 285, when the amount of particulate matter accumulated therein exceeds a predetermined threshold value. The regeneration process generally provides for the ECU 450 to increase the temperature of the DPF 450 up to a temperature (e.g. 630° C.) that causes the accumulated particulate matter to burn off. To achieve this temperature increase, the ECU 450 may be configured to command the fuel injectors 160 to operate so-called post injections, namely to inject small quantities of fuel into the combustion chambers 150 during the exhaust stroke of piston 140, when the exhaust ports 220 are already open.

In this way the post injected fuel quantities exit unburnt from the combustion chambers 150 and reach the DOC 280, where they are ignited and generate a stream of hot exhaust gas that is able to increase the temperature of the DPF 285. As a consequence, the efficiency of the regeneration process of the DPF 285 depends on the conversion efficiency of the DOC 280, namely on the capability of the precious metals contained in the wash coat of the DOC 280 to prompt the ignition of the post injected fuel quantities.

For this reason, the ECU 450 may be further configured to execute a diagnostic strategy aimed to identify whether the conversion efficiency of DOC 280 is high enough to support a regeneration process of the DPF 285. This diagnostic strategy may be based on the fact that, if the oxidization efficiency of the DOC 280 is poor, during a regeneration process of the particulate filter 285, not all the post injected fuel quantities will burn inside the DOC 280. Hence, these post injected fuel quantities will exit unburnt from the DOC 280 and will reach the DPF 285, where they will be at least partially ignited thanks to the precious metals that are contained in its wash coat. As a direct consequence of this phenomenon, the temperature of the exhaust gas between the DOC 280 and the DPF 285 should be lower than expected, whereas the temperature of the exhaust gas downstream of the DPF 285 should be higher than expected.

Based on these considerations, the diagnostic strategy provides that the ECU 450 operates the ICE 110 so as to perform a regeneration process of the DPF 285 according to the procedure that has been explained above (block S100). While the regeneration process is underway, the diagnostic strategy provides for the ECU 450 to determine a first value T' of the exhaust gas temperature in the exhaust duct 275 between the DOC 280 and the DPF 285 (block S105), and to determine a second value T" of the exhaust gas temperature in the exhaust duct 275 downstream of the DPF 285 (block S110). In particular, the first value T' may be measured by means of the first temperature sensor 430 and the second value T" may be measured by means of the second temperature sensor 435.

The first value T' of the exhaust gas temperature is compared to a first threshold value $T'_{th}$ thereof (block S115). The first threshold value $T'_{th}$ may represent the temperature value above which the accumulated particulate matter burns off, for example in a neighborhood of 630° C. To a certain extent the first threshold value $T_{th}$ may depend on the engine operating conditions, namely on the engine speed and on the engine torque. For this reason, the ECU 450 may be configured to determine the current values of the engine speed and of the engine torque and to use them to determine a corresponding first threshold value $T'_{th}$ of the exhaust gas temperature. By way of example, the first threshold value $T'_{th}$ may be retrieved from a first calibration map stored in the memory system 460.

At the same time, the second value T" of the exhaust gas temperature is compared to a second threshold value $T''_{th}$ thereof (block S120). The second threshold value $T''_{th}$ should be indicative of the fact that exothermic reactions are occurring inside the DPF 285, which increase the exhaust gas temperature. For this reason, the second threshold value $T''_{th}$ may be equal or larger than the first threshold value $T'_{th}$, for example in a neighborhood of 800° C. To a certain extent also the second threshold value $T''_{th}$ may depend on the engine operating conditions, namely on the engine speed and on the engine torque. For this reason, the ECU 450 may be configured to determine the current values of the engine speed and of the engine torque and to use them to determine a corresponding second threshold value $T''_{th}$ of the exhaust gas temperature. By way of example, the second threshold value $T''_{th}$ may be retrieved from a second calibration map stored in the memory system 460.

If the first value T' of the exhaust gas temperature is smaller than the first threshold value $T'_{th}$ and contemporaneously the second value T" of the exhaust gas temperature is bigger than the second threshold value $T''_{th}$ (block S125), an anomalous condition is met that leads the ECU 450 to identify that a malfunctioning of the DOC 280 is occurring (block S130). In particular, the malfunctioning of the DOC 280 may be identified provided that (i.e. only if) the aforesaid anomalous condition is met for longer than a predetermined time period, thereby reducing the possibilities of false identifications. This predetermined time period may be a calibration parameter and may be a few seconds long.

Once a malfunctioning of the DOC 280 has been identified, the ECU 450 may be configured to perform one or more recovery actions (block S135). These recovery actions may include, but are not limited to, the inhibition of the regeneration process, the limitation of the engine torque and the generation of a signal perceivable by a driver, for example through the activation of a signaler (e.g. a light) disposed in a dashboard of the automotive system 100. Thanks to this last action, the driver may be informed of the malfunctioning of the DOC 280 and suggested to take some countermeasures, for example to go to the nearest car service center.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating a combustion engine having an exhaust duct with an aftertreatment system including an oxidation catalyst disposed in the exhaust duct and a particulate filter disposed in the exhaust duct downstream of the oxidation catalyst, the method comprising:
    operating the internal combustion engine to perform a regeneration process of the particulate filter;
    determining a first value of exhaust gas temperature in the exhaust duct between the oxidation catalyst and the particulate filter;
    determining a second value of exhaust gas temperature in the exhaust duct downstream of the particulate filter;
    identifying a malfunction of the oxidation catalyst when the first value of exhaust gas temperature is below a first predetermined threshold value thereof and contemporaneously the second value of exhaust gas temperature is above a second predetermined threshold value thereof during the regeneration process; and
    performing a recovery action for operating the combustion engine when the malfunction is identified, wherein the recovery action includes at least one of inhibiting the regeneration process, limiting engine torque during the regeneration process, and generating a signal perceivable by a driver.

2. The method according to claim 1, further comprising measuring an exhaust gas temperature to determine the first value.

3. The method according to claim 2, further comprising measuring an exhaust gas temperature to determine the second value.

4. The method according to claim 1, wherein the second threshold value is equal to or greater than the first threshold value.

5. The method according to claim 1, further comprising determining the first threshold value as a function of an engine speed and an engine torque of the internal combustion engine.

6. The method according to claim 5, further comprising determining the second threshold value as a function of an engine speed and an engine torque of the internal combustion engine.

7. The method according to claim 1, wherein identifying the malfunctioning of the oxidation catalyst further comprises determining when the first value of exhaust gas temperature is below the first threshold value and contemporaneously the second value of exhaust gas temperature is above the second threshold value for longer than a predetermined time period during the regeneration process.

8. The method according to claim 1, wherein the recovery action consists of inhibiting the regeneration process when a malfunction is identified.

9. The method according to claim 1, wherein the recovery action consists of limiting engine torque during the regeneration process when a malfunction is identified.

10. The method according to claim 1, wherein the recovery action consists of generating a signal perceivable by a driver when a malfunctioning is identified.

11. A system for diagnosing efficiency of an aftertreatment system of an internal combustion engine, wherein the aftertreatment system includes an exhaust duct, an oxidation catalyst disposed in the exhaust duct and a particulate filter disposed in the exhaust duct downstream of the oxidation catalyst, wherein the system comprises an electronic control unit configured to:
  operate the internal combustion engine to perform a regeneration process of the particulate filter;
  determine a first value of exhaust gas temperature in the exhaust duct between the oxidation catalyst and the particulate filter;
  determine a second value of exhaust gas temperature in the exhaust duct downstream of the particulate filter;
  identify a malfunction of the oxidation catalyst when the first value of exhaust gas temperature is below a first predetermined threshold value thereof and contemporaneously the second value of exhaust gas temperature is above a second predetermined threshold value thereof during the regeneration process of the particulate filter; and
  perform a recovery action for operating the combustion engine when the malfunction is identified, wherein the recovery action includes at least one of inhibiting the regeneration process, limiting engine torque during the regeneration process, and generating a signal perceivable by a driver.

* * * * *